Feb. 9, 1971 T. CARRIGAN 3,561,849
MIRROR MOUNTING MECHANISM FOR WHEEL ALIGNING APPARATUS
Filed Feb. 17, 1969
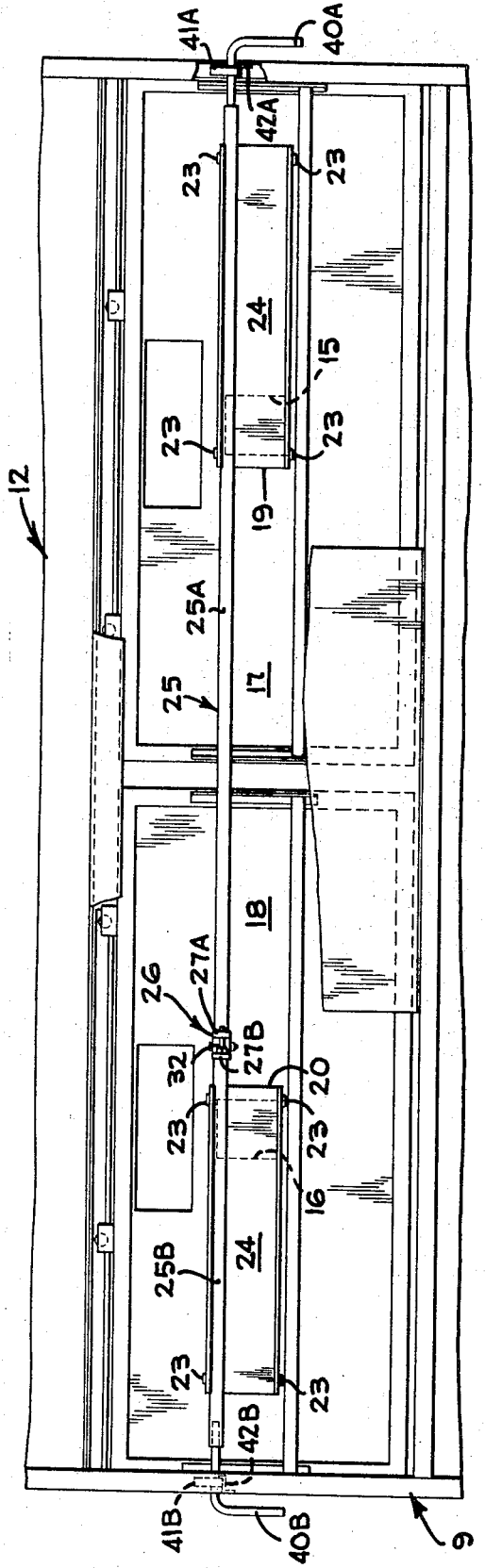
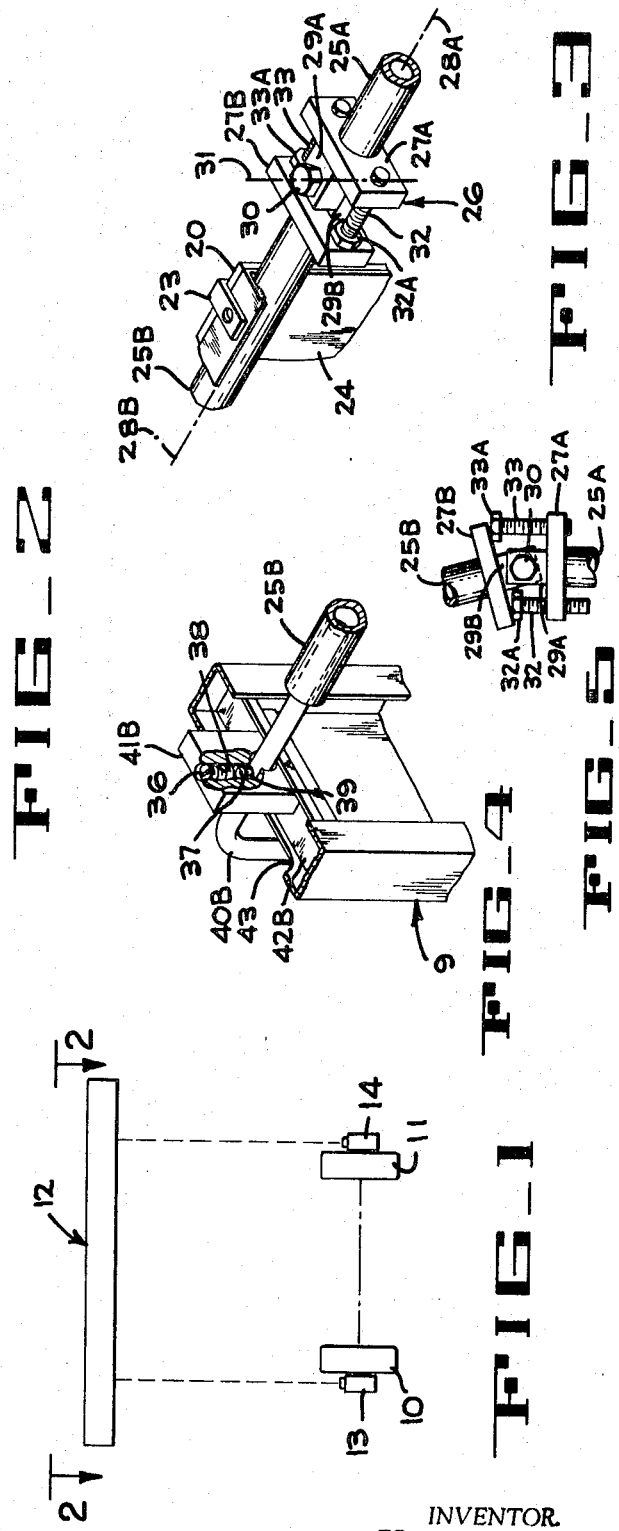
INVENTOR.
TRACY CARRIGAN
BY *F. W. Anderson*
*C. C. Tripp*
ATTORNEYS United States Patent Office 3,561,849
Patented Feb. 9, 1971

3,561,849
MIRROR MOUNTING MECHANISM FOR WHEEL ALIGNING APPARATUS
Tracy Carrigan, Lansing, Mich., assignor to FMC Corporation, San Jose, Calif., a corporation of Delaware
Filed Feb. 17, 1969, Ser. No. 799,820
Int. Cl. G02b 5/08
U.S. Cl. 350—299     7 Claims

ABSTRACT OF THE DISCLOSURE

A background unit which is positioned in front of a vehicle to be aligned has a frame with a mirror bar mounted thereon. The mirror bar has two sections, each section having a mirror secured thereto. The outer ends of each section are rotatably mounted in a bearing block which is slidably mounted on the side of the frame. The inner ends of the bar sections, each of which have flanges, are pivotally connected on an axis substantially perpendicular to the bar and parallel to the mirrors. Two screws, threadedly received in one flange and abutting the other flange, lock the two bar sections into one rigid mirror bar.

BACKGROUND OF THE INVENTION

In one type of wheel aligning apparatus, a background unit is mounted in front of the vehicle to be aligned, and reference indicia are projected toward the unit by projectors mounted on the front wheels of the vehicle. At least one mirror is provided at the unit for each projector, and the reference indicia is reflected back toward the projectors by the mirrors. Usually it is important that the reference indicia be reflected back to a precise spot at the projector and, accordingly, it is necessary that the mirrors be precisely aligned in the background unit. It is necessary, for precise wheel alignment, to be able to adjust the mirrors with respect to each other, and it is desirable, for some adjustments, to be able to adjust the two mirrors as a unit in the background unit.

SUMMARY OF THE INVENTION

In the present invention, a mirror mounting construction is provided which permits of relative adjustment between the two mirrors in wheel aligning apparatus, and also makes possible the adjustment of the two mirrors as a unit. In brief, in the preferred form of the invention, the mirror bar is formed in two sections, and each section has a mirror mounted thereon. The inner ends of the sections are pivotally joined on a pivot axis, and each section has a flange thereon normal to the axis of the bar section. Two bolts threadedly received in the flange of one bar section engage the other flange of the other bar section to lock the two bar sections into one rigid mirror bar. However, by rotating the bolts, the alignment between the two bar sections can be adjusted to effect relative adjustment between the two mirrors which are secured to the mirror bar. Specifically, by adjustment of the joint between the mirror bars, the mirror bars can be positioned to lie in the same plane.

The outer ends of the mirror bar sections are rotatably mounted in bearing blocks which are slidably mounted in the frame of the background unit for horizontal movement toward and away from the vehicle being tested. Adjustment of the two mirrors, as a unit, can be effected with this construction. The mirror bar can be rotated about its longitudinal axis to tilt the mirrors up or down. Also, one end or the other of the mirror bar can be advanced or retracted with respect to the vehicle to tilt the mirrors slightly to one side or the other.

It is therefore one object of the present invention to provide a simple mirror bar construction which will permit adjustment of one mirror with respect to the other mirror. It is another object of the invention to permit adjustment of the mirrors relative to each other to position them precisely in a common plane. It is another object of the present invention to provide a mirror bar construction in which the mirrors can be adjusted relative to each other and adjusted as a unit in the frame of the background unit in which they are mounted.

BRIEF DESCRIPTION OF THE DRAWING

FIG. 1 is a plan view of the two front wheels of an automobile, with projectors mounted thereon aimed at mirrors mounted in a background unit in accordance with the present invention;

FIG. 2 is a view from the rear, taken on line 2—2 of FIG. 1, of the background unit in which the mirror bar is mounted;

FIG. 3 is a view in perspective of the hinged joint connecting the two mirror bar sections;

FIG. 4 is a view in perspective of one end of the mirror bar showing the mounting thereof in the frame of the background unit; and FIG. 5 is a plan view of the hinged joint showing for illustrative purposes an exaggerated adjustment thereof.

DESCRIPTION OF THE PREFERRED EMBODIMENT

There is shown in FIG. 1 a plan view of the front wheels 10, 11 of an automobile which is positioned in front of a background unit 12. Each wheel 10, 11 has a projector 13, 14 mounted thereon which is aimed at the unit 12 to produce an indication of the alignment of the wheel. In one form of wheel alignment, a reference indicia, or image, is projected from a projector (such as 14) through an opening 16 (FIG. 2) in a panel 18 mounted on the frame 9 of the background unit 12. The projected image strikes mirror 20 for reflection back to the front of the projector 14 from which the indicia was projected. At the same time, a reference indicia is projected from projector 13 through opening 15 in panel 17 of the background unit 12 to strike mirror 19 for reflection back to projector 13. It is important that each mirror be precisely positioned so that each projected reference indicia is reflected back along a predetermined path by the mirror when the wheel assumes a predetermined reference position so that any deviation of the reflected reference indicia from that predetermined path will serve as an indication that the wheel is displaced from the reference position.

A mirror bar 25 has two mirror bar sections 25A and 25B, hinged together at a joint 26. Mirror 19 is secured by clips 23 to mirror bracket 24 which is welded to mirror bar section 25A. Mirror 20 is secured to mirror bar section 25B in a similar manner.

The joint 26 is shown best in FIG. 3. A flange 27A is secured to the inner end of mirror bar section 25A, and the flange is perpendicular to the longitudinal axis 28A of that mirror bar section. A similar flange 27B is secured to the inner end of mirror bar section 25B, and the flange is perpendicular to the longitudinal axis 28B of that mirror bar section. An ear 29A extends outwardly from flange 27A, and a similar ear 29B extends outwardly from flange 27B. The two ears 29A, 29B are offset from each other so that when axis 28A and 28B are aligned, the two ears nest in overlapping relationship as shown in FIG. 3. A bolt 30 extending through ears 29A, 29B define a pivot axis 31 substantially perpendicular to the mirror bar (and the longitudinal axes 28A, 28B thereof) and parallel to the mirrors 19 and 20. A nut, not shown, on the bolt holds the hinged mirror bar sections together but is not so tight as to prevent relative movement between the mirror bar sections (when unrestrained by other members) in a plane substantially normal to the pivot axis and the mirrors. The two mirror bar sections can, however, be rigidly secured together in a desired relationship by bolts 32 and 33 so that no relative movement can occur between the two mirror bar sections. These bolts are threadedly received in flange 27A and have heads 32A and 33A which, when the bolts are screwed out of flange 27A, will abut flange 27B to hold the one mirror bar section fast with respect to the other mirror bar section. To change the relationship between the mirror bar sections 25A, 25B, one of the bolts (32 or 33) is screwed out of flange 27A while the other bolt is screwed in, as shown in FIG. 5.

A handle 40A, which is rotatably received in bearing block 41A, is secured to the outer end of mirror bar section 25A. A similar handle 40B, rotatably received in bearing block 41B, is secured to the outer end of mirror bar section 25B. A nylon button 39, received in bore 38, is urged against the handle by spring 37 which is retained in bore 38 by set screw 36. Button 39 holds the handle 40B, and the mirror bar 25, in a selected rotary position. As shown best in FIG. 4, the bearing blocks 41A, 41B are received on shelves 42A, 42B which are secured in the sides of the frame of background unit 12. The handles 40A, 40B extend through slots 43 for manipulation by the operator from beside the frame.

The mirrors can be rotated about the longitudinal axis 28A, 28B, as a unit by rotation of a handle 40A or 40B. The mirrors can also be turned slightly from one side to the other by moving one handle horizontally in the slot, toward or from a vehicle, to incline the mirror bar with respect to the frame panels 17, 18. Adjustment of the mirrors about their longitudinal axes to tilt them up or down by rotation of a handle might, for example, be necessary to accommodate cars with wheels of different size. Tilting the mirrors slightly laterally might, for example, be necessary to accommodate cars which are not perfectly square with the background unit.

Although the best mode contemplated for carrying out the present invention has been herein shown and described, it will be apparent that modification and variation may be made without departing from what is regarded to be the subject matter of the invention.

What is claimed is:

1. In wheel aligning mechanism having a background panel unit for positioning in front of a vehicle to be aligned, said unit having a frame, a bearing block slidably mounted at each side of said frame for movement toward or away from said vehicle, a first mirror bar section having an outer end rotatably mounted in one of said bearing blocks, said first mirror bar section having a first mirror rigidly secured thereon, a second mirror bar section having an outer end rotatably mounted in the other bearing block, said second mirror bar section having a second mirror rigidly secured thereon, friction means in said bearing blocks for frictionally holding said bar sections in adjusted position, relative to the frame, hinge means pivotally connecting said mirror bar sections at their inner ends on an axis normal to said bar sections and parallel to the reflecting surfaces of said mirrors and each section having a flange adjacent the inner end, and means extending between said flanges to lock the two mirror bar sections into a continuous rigid mirror bar.

2. An apparatus according to claim 1 wherein said locking means is effective to lock said mirror bar sections in positions wherein said first and second planes lie in a common plane.

3. An apparatus according to claim 1 in which said hinge means includes a flange at the inner end of each bar section, and at least one adjusting member extending between said flanges.

4. An apparatus according to claim 3 in which a pair of adjusting members in the form of bolts threadedly received in one flange abut against the other flange to hold the two mirror bar sections rigidly with respect to each other.

5. An apparatus according to claim 1 wherein said mirror bar sections and said hinge means are shiftable as a unit laterally relative to the frame while maintaining the mirrors parallel.

6. An apparatus according to claim 1 wherein said mirror bar sections are rotatable about their own longitudinl axes to adjust the angle of said first and second planes relative to a horizontal reference plane.

7. An apparatus according to claim 5 wherein said mirror bar sections are rotatable about their own longitudinal axes to adjust the angle of said first and second planes relative to a horizontal reference plane.

References Cited

UNITED STATES PATENTS

| 2,213,605 | 9/1940 | Mathieu | 350—301 |
| 3,159,916 | 12/1964 | Hunter | 356—155 |
| 3,363,504 | 1/1968 | Lill | 350—299 |

DAVID SCHONBERG, Primary Examiner

M. J. TOKAR, Assistant Examiner

U.S. Cl. X.R.

356—155